US 6,623,168 B2

(12) United States Patent
Matsuyama et al.

(10) Patent No.:    US 6,623,168 B2
(45) Date of Patent:    Sep. 23, 2003

(54) TAPERED ROLLER BEARING

(75) Inventors: Hiroki Matsuyama, Kitakatsuragi-gun (JP); Seiji Nakahama, Osaka (JP); Keiichi Furukawa, Ikoma-gun (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/055,368

(22) Filed: Jan. 25, 2002

(65) Prior Publication Data

US 2002/0102041 A1 Aug. 1, 2002

(30) Foreign Application Priority Data

Jan. 26, 2001 (JP) ........................ 2001-018596

(51) Int. Cl.$^7$ ............ F16C 33/36; F16C 33/58
(52) U.S. Cl. ........ 384/568; 384/564; 384/569; 384/571; 384/450
(58) Field of Search ................ 384/450, 563, 384/564, 565, 568, 569, 571

(56) References Cited

U.S. PATENT DOCUMENTS 3,447,849 A * 6/1969 Harris et al. ............. 384/450
6,502,996 B2 * 1/2003 Joki ......................... 384/571

FOREIGN PATENT DOCUMENTS

| JP | 5-42754 | 6/1993 |
| JP | 11-148514 | 6/1999 |
| JP | 11-236920 | 8/1999 |
| JP | 2000-170774 | 6/2000 |

* cited by examiner

Primary Examiner—Thomas R. Hannon
(74) Attorney, Agent, or Firm—Nixon & Vanderhye P.C.

(57) ABSTRACT

The large-end-face roughness $\sigma_1$ of the tapered roller is set to be not less than 0.04 $\mu$mRa, consequently the assembling torque becomes generally constant and smaller in fluctuation over a range that the cone-back rib face roughness $\sigma_2$ is 0.03–0.23 $\mu$mRa. Also, the composite roughness $\sigma = (\sigma_1^2 + \sigma_2^2)^{1/2}$ is set to be not more than 0.17 $\mu$mRa, consequently the preload retention rate on the regression curve can be made 90%. Further, the radius of curvature ratio R1/R2 resulting from dividing the convex radius of curvature R1 of the large end face of the tapered roller by the concave radius of curvature R2 of the cone-back rib face of the inner ring is set to be not more than 0.35, consequently the rotating torque becomes smaller in variation and also smaller in fluctuations over a range that the composite roughness $\sigma$ is 0.05–0.22 $\mu$mRa.

2 Claims, 7 Drawing Sheets

Fig. 8

MEASURED VALUES OF ROTATING TORQUE
(UPPER: AVERAGE VALUE, LOWER: FLUCTUATION, UNIT: Nm)

| CONE-BACK RIB FACE ROUGHNESS (μmRa) | ROLLER END FACE ROUGHNESS (μmRa) | | | | |
|---|---|---|---|---|---|
| | 0.02 | 0.04 | 0.10 | 0.22 |
| 0.03 | 0.66 (0.58) | 1.07 (0.13) | 1.03 (0.06) | 1.18 (0.04) |
| 0.07 | 0.58 (0.50) | 1.06 (0.10) | 1.00 (0.09) | 1.18 (0.05) |
| 0.11 | 0.78 (0.52) | 1.09 (0.07) | 1.04 (0.10) | 1.17 (0.07) |
| 0.23 | 1.02 (0.06) | 1.11 (0.07) | 1.04 (0.08) | 1.14 (0.04) |

Fig. 9

MEASURED VALUES OF ROTATING TORQUE
(UPPER : AVERAGE VALUE, LOWER : FLUCTUATION, UNIT : Nm)

| RADIUS OF CURVATURE RATIO R1/R2 | COMPOSITE ROUGHNESS (μmRa) | | | |
|---|---|---|---|---|
| | 0.05 | 0.10 | 0.22 | |
| 0.07 | 1.08 (0.09) | 1.03 (0.08) | 1.17 (0.05) | |
| 0.35 | 1.07 (0.13) | 1.03 (0.06) | 1.18 (0.04) | |
| 0.69 | 0.89 (0.40) | 0.94 (0.06) | 1.21 (0.04) | |

TAPERED ROLLER BEARING

BACKGROUND OF THE INVENTION

The present invention relates to a tapered roller bearing to be used in, for example, differential units, transmissions and the like.

In tapered roller bearings used in differential units, transmissions and the like of automobiles, preload given in assembly process is controlled by a torque under low-speed rotation. Large variations in this torque under low-speed rotation (assembling torque), if involved, could lead to failures such as earlier seizure due to excessively large preloads and rigidity deteriorations due to excessively small preloads.

Therefore, in order to give a proper preload to the tapered roller bearing, it is required that the assembling torque should less vary and less fluctuate.

The assembling torque of a tapered roller bearing arises, in most cases, from the friction between the inner-ring cone-back rib face and the roller large end face. Accordingly, surface roughness of the inner-ring cone-back rib face and the roller large end face, thickness of an oil film to be formed between the inner-ring cone-back rib face and the roller large end face, contact position between the rib face and the end face, and the like would largely affect the coefficient of friction, i.e., the torque.

As a technique of torque stabilization, a design in which the rib face and the roller end face are roughened has generally been adopted. Also, it is often the case that a rib roughness $\sigma_1$ and a roller-end-face roughness $\sigma_2$ are represented by a composite roughness $\sigma$ shown by the following equation (1):

$$\sigma = (\sigma_1^2 + \sigma_2^2)^{1/2} \tag{1}$$

where the assembling torque is controlled by this composite roughness $\sigma$.

However, there is a difference in the extent of effect on the assembling torque between the rib face and the roller end face. It has been found out by the inventors' studies that assembling torque cannot be controlled enough only by means of the above composite roughness $\sigma$.

Also, since contact portion between the rib face and the roller end face varies in surface roughness and configuration due to friction as the operating time elapses, the preload on the tapered roller bearing decreases as compared with that at the start of operation. Further, the preload variation increases with increasing roughness of the rib face and the roller end face, i.e., increasing composite roughness.

Due to this, it has been difficult for conventional designs to achieve preload holding performance and constant assembling torque performance at the same time.

Meanwhile, the preload holding performance being high (the preload variation being small) is an important performance that is required by customers in addition to the variation in assembling torque being small.

SUMMARY OF THE INVENTION

Accordingly, an object of the present invention is to provide a tapered roller bearing which is capable of stabilizing the assembling torque and improving the preload holding performance.

In order to achieve the above object, there is provided a tapered roller bearing in which a large-end-face roughness $\sigma_1$ of a tapered roller is not less than 0.04 $\mu$mRa;

a composite roughness $\sigma$, which is a square root of a sum between a square of the large-end-face roughness $\sigma_1$ and a square of an inner ring large-end-face roughness $\sigma_2$ that makes sliding contact with the large end face of the tapered roller, is set to be not more than 0.17 $\mu$mRa;

a radius of curvature ratio R1/R2, which results from dividing a convex radius of curvature R1 of the large end face of the tapered roller by a concave radius of curvature R2 of the inner-ring large end face, is set to be not more than 0.35.

In the tapered roller bearing of this constitution, since the large-end-face roughness $\sigma_1$ of the tapered roller is set to be not less than 0.04 $\mu$mRa, the rotating torque (assembling torque) becomes generally constant (average value: 1.00–1.18 N·m) and smaller in fluctuation (0.13 N·m at maximum) over a range that the cone-back rib face roughness $\sigma_2$ is 0.03–0.23 $\mu$mRa (center-line average roughness) as shown in FIG. 4. Meanwhile, when the large-end-face roughness $\sigma_1$ is set to 0.02 $\mu$mRa, torque variations are considerably large (maximum variation: 0.58 N·m) so that the rotating torque varies over a range of 0.58–1.02 N·m under the effects of the rib face roughness $\sigma_2$.

Also, since the composite roughness $\sigma = (\sigma_1^2 + \sigma_2^2)^{1/2}$ is set to be not more than 0.17 $\mu$mRa, the preload retention rate on the regression curve can be made 90% or more as shown in FIG. 7.

Also, since the radius of curvature ratio R1/R2 resulting from dividing the convex radius of curvature R1 of the large end face of the tapered roller by the concave radius of curvature R2 of the cone-back rib face of the inner ring is set to be not more than 0.35, the rotating torque becomes smaller in variation (1.03–1.18 N·m) and also smaller in fluctuations (0.13 N·m at most) over a range that the composite roughness $\sigma$ is 0.05–0.22 $\mu$mRa as shown in FIG. 6. Meanwhile, when the radius of curvature ratio R1/R2 is set to 0.69, larger than 0.35, the average value of rotating torque becomes lower (0.89 N·m) and also its fluctuations become larger (0.40 N·m at most) at a composite roughness $\sigma = 0.05$ $\mu$mRa.

Further, even if the composite roughness $\sigma$ is kept generally equal as shown in FIG. 5, a change of the roller-end-face roughness $\sigma_1$ causes average value and fluctuations of the rotating torque to change so that the rotating torque cannot be controlled only by the composite roughness $\sigma$. That is, the roller-end-face roughness $\sigma_1$ has a larger effect on the torque under low-speed rotation than the rib-face roughness $\sigma_2$, and therefore the control of the roller-end-face roughness $\sigma_1$ is important for the stabilization of assembling torque.

Therefore, according to the tapered roller bearing of this constitution, the stabilization of assembling torque and the preload holding performance can be achieved at the same time.

In one embodiment of the present invention, the large-end-face roughness $\sigma_1$ of the tapered roller is set to be not more than 0.10 $\mu$mRa;

the composite roughness $\sigma$ is set to be not more than 0.12 $\mu$mRa; and the radius of curvature ratio R1/R2 is set to be not less than 0.07.

In this embodiment, since the large-end-face roughness $\sigma_1$ of the tapered roller is set to be not less than 0.04 $\mu$mRa and not more than 0.10 $\mu$mRa, the rotating torque can be made to fall within a range of 1.00–1.11 N·m in average value so that the rotating torque can be made even closer to a constant value, as shown in FIG. 4.

Also, since the composite roughness $\sigma$ is set to be not more than 0.12 $\mu$mRa, the preload retention rate can be made to be 92% or more on a regression curve as shown in FIG. 7.

Also, since the radius of curvature ratio R1/R2 is set to be not less than 0.07 and not more than 0.35, the rotating torque becomes smaller in variation (1.03–1.18 N·m) and also smaller in fluctuation (0.13 N·m at most) over a range that the composite roughness σ is 0.05–0.22 μmRa as shown in FIG. 6.

Further, the radius of curvature ratio R1/R2 being not less than 0.07 means that the radius of curvature R2 of the cone-back rib face of the inner ring is not infinite, and that the cone-back rib face is not such flat as shown in FIG. 2 but such a concave curved surface as shown in FIG. 3. Therefore, an oil film is more easily formed between the cone-back rib face and the roller end face so that contact surface pressure also becomes lower. Thus, preload holding performance and seizure-resistant performance are improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a view of a list table showing data of the characteristic view of FIG. 4; and FIG. 9 is a view of a list table showing data of the characteristic view of FIG. 6.

DETAILED DESCRIPTION OF THE PREFERRED EMBODIMENTS

Hereinbelow, the present invention is described in detail by way of embodiments thereof illustrated in the accompanying drawings.

Figure 1:
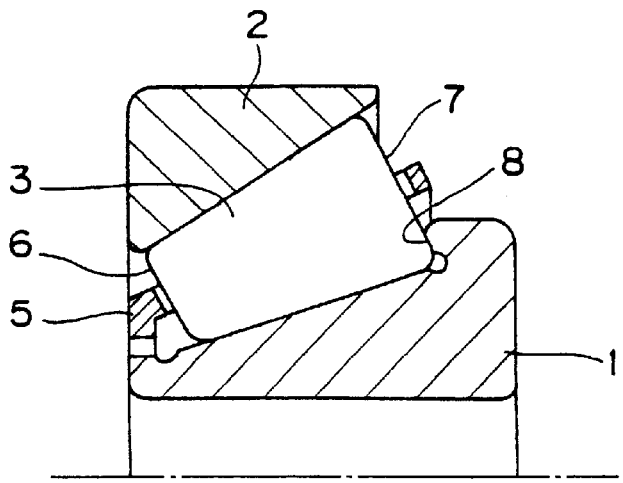
FIG. 1 is a sectional view of an embodiment of the tapered roller bearing according to the present invention.

FIG. 1 shows a sectional view of an embodiment of the tapered roller bearing according to the present invention. This tapered roller bearing of this embodiment includes an inner ring 1 and an outer ring 2, and tapered rollers 3 arranged in a plurality between the inner ring 1 and the outer ring 2 so as to be spaced circumferentially at specified intervals. These tapered rollers 3 are held generally equidistant by an annular cage 5.

In this embodiment, surface roughness $\sigma_1$ of a large end face 7 out of a small end face 6 and the large end face 7 of the tapered rollers 3 is set to be not less than 0.04 μmRa and not more than 0.10 μmRa.

Assuming that surface roughness of a cone-back rib face 8 of the inner ring 1 that makes sliding contact with the large end face 7 of the tapered roller 3 is $\sigma_2$, composite roughness σ between the surface roughness $\sigma_1$ of the large end face 7 and surface roughness $\sigma_2$ of the cone-back rib face 8 is set to not more than 0.12 μmRa. That is, composite roughness $\sigma = (\sigma_2 + \sigma_2)^{1/2}$ is set to be not more than 0.12 μmRa.

Figure 3:
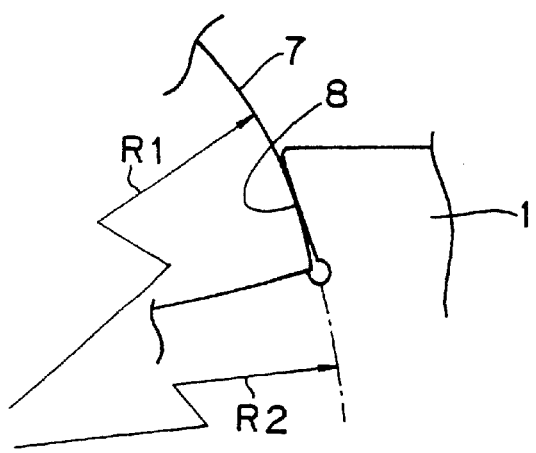
FIG. 3 is a partial sectional view of a modification of the embodiment in which the rib face is curved.

Also, in this embodiment, as shown in FIG. 3, a radius of curvature ratio R1/R2 resulting from dividing a convex radius of curvature R1 of the large end face 7 of the tapered roller 3 by a concave radius of curvature R2 of the cone-back rib face 8 of the inner ring 1, is set to be not less than 0.07 and not more than 0.35.

Figure 4:
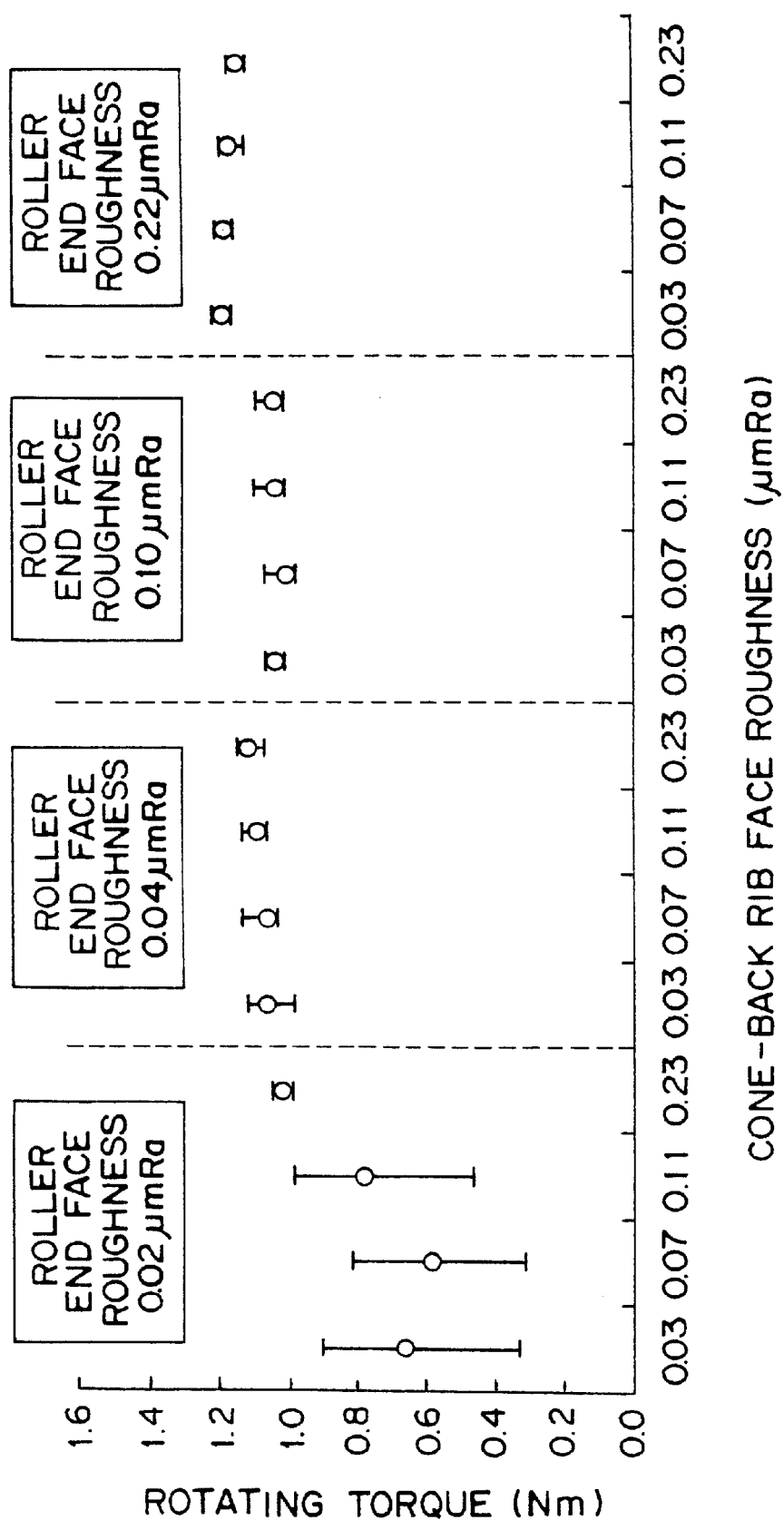
FIG. 4 is a characteristic view showing the relationship between rotating torque and roller-end-face roughness (rib-face roughness) in the embodiment.

According to the tapered roller bearing of this constitution, since the surface roughness $\sigma_1$ of the large end face 7 of the tapered roller 3 is set to be not less than 0.04 μmRa and not more than 0.10 μmRa, average values of rotating torque can be made to fall within a range of 1.00–1.11 (N·m) while the rib roughness is within a range of 0.03–0.23 μmRa as shown in the characteristic view of FIG. 4 and the list of FIG. 8 showing its numerical data. Further, variation in the average value (difference between maximum and minimum values (fluctuation value)) of rotating torque found to be 0.13 at most. Thus, the rotating torque can be made closer to a constant value.

Figure 7:
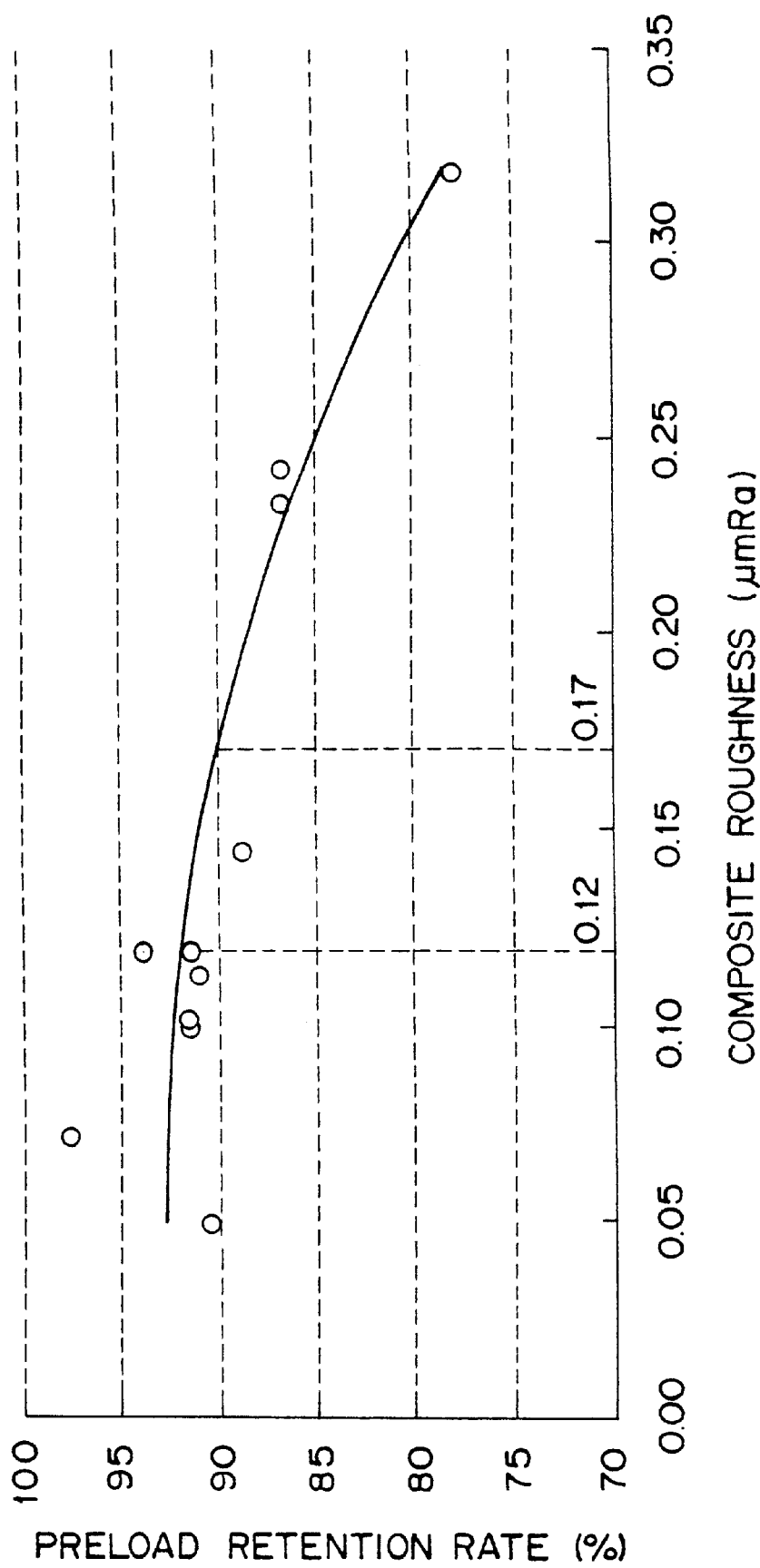
FIG. 7 is a characteristic view showing the relationship between preload retention rate and composite roughness.

Further, since the composite roughness 6 is set to be not more than 0.12 μmRa in this embodiment, the preload retention rate was able to be made 92% or more on a regression curve as shown in FIG. 7. FIG. 7 gives measurement examples of preload variations after the bearing assembled with preload at a certain positional was operated for a specified time (20 hours), where two tapered roller bearings with a preload of 5.5 kN applied thereto were operated for 20 hours at a rotating speed of 2000 rpm, with gear oil 85W-90 and an oil temperature of 70° C., and their preload after cooling was measured. In this case, the ratio of R1/R2 was set to be not more than 0.35.

Figure 6:
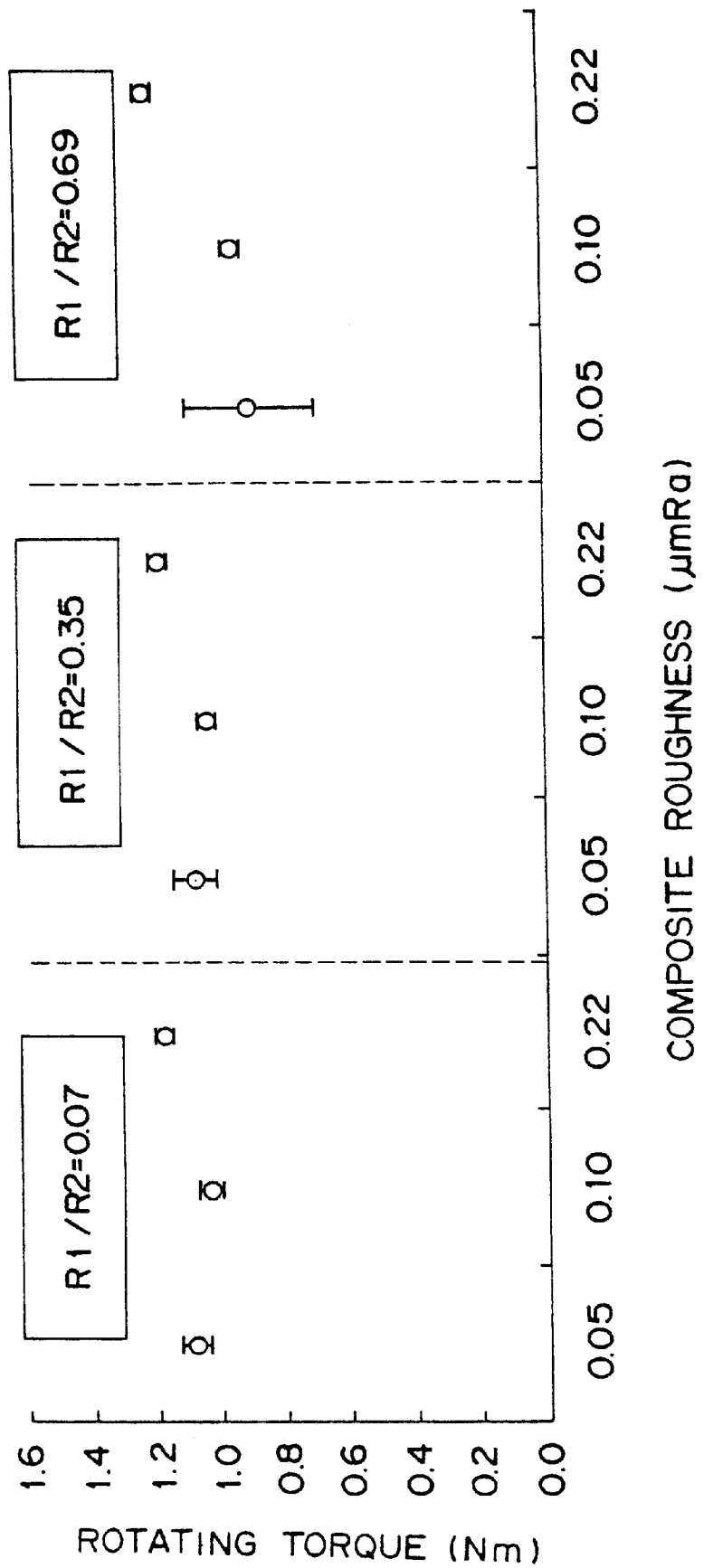
FIG. 6 is a characteristic view showing the relationship between the rotating torque and a radius-of-curvature ratio R1/R2.

In this embodiment also, since the radius of curvature ratio R1/R2 is set to be not less than 0.07 and not more than 0.35, the rotating torque becomes smaller in variation (average value: 1.03–1.18 N·m) and also smaller in difference (fluctuation) (0.13 N·m at maximum) over a range that the composite roughness σ is 0.05–0.22 μmRa as shown in the characteristic view of FIG. 6 and the list of FIG. 9 showing its numerical data. Meanwhile, when the radius of curvature ratio R1/R2 is set to be 0.69, larger than 0.35, the average value of rotating torque becomes lower (0.89 N·m) with composite roughness σ=0.05 (μmRa) and also its variations become larger (0.40 N·m at maximum).

Figure 2:
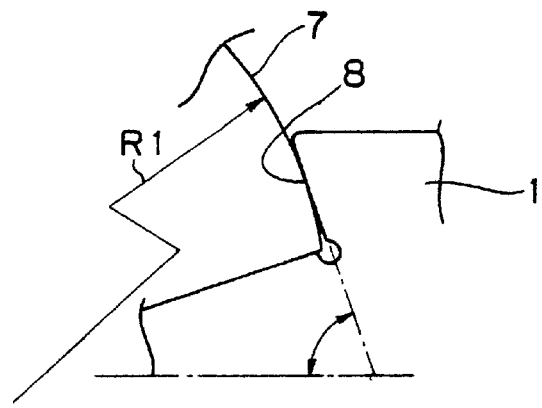
FIG. 2 is a partial sectional view of a modification of the embodiment in which the rib face is flat.

Further, the radius of curvature ratio R1/R2 being not less than 0.07 means that the radius of curvature R2 of the cone-back rib face 8 of the inner ring 1 is not infinite, and that the cone-back rib face 8 is not such flat as shown in FIG. 2 but such a concave curved surface as shown in FIG. 3. Therefore, an oil film is more easily formed between the cone-back rib face 8 and the roller end face 7 so that contact surface pressure also becomes lower. Thus, preload holding performance and seizure-resistant performance are improved.

Figure 5:
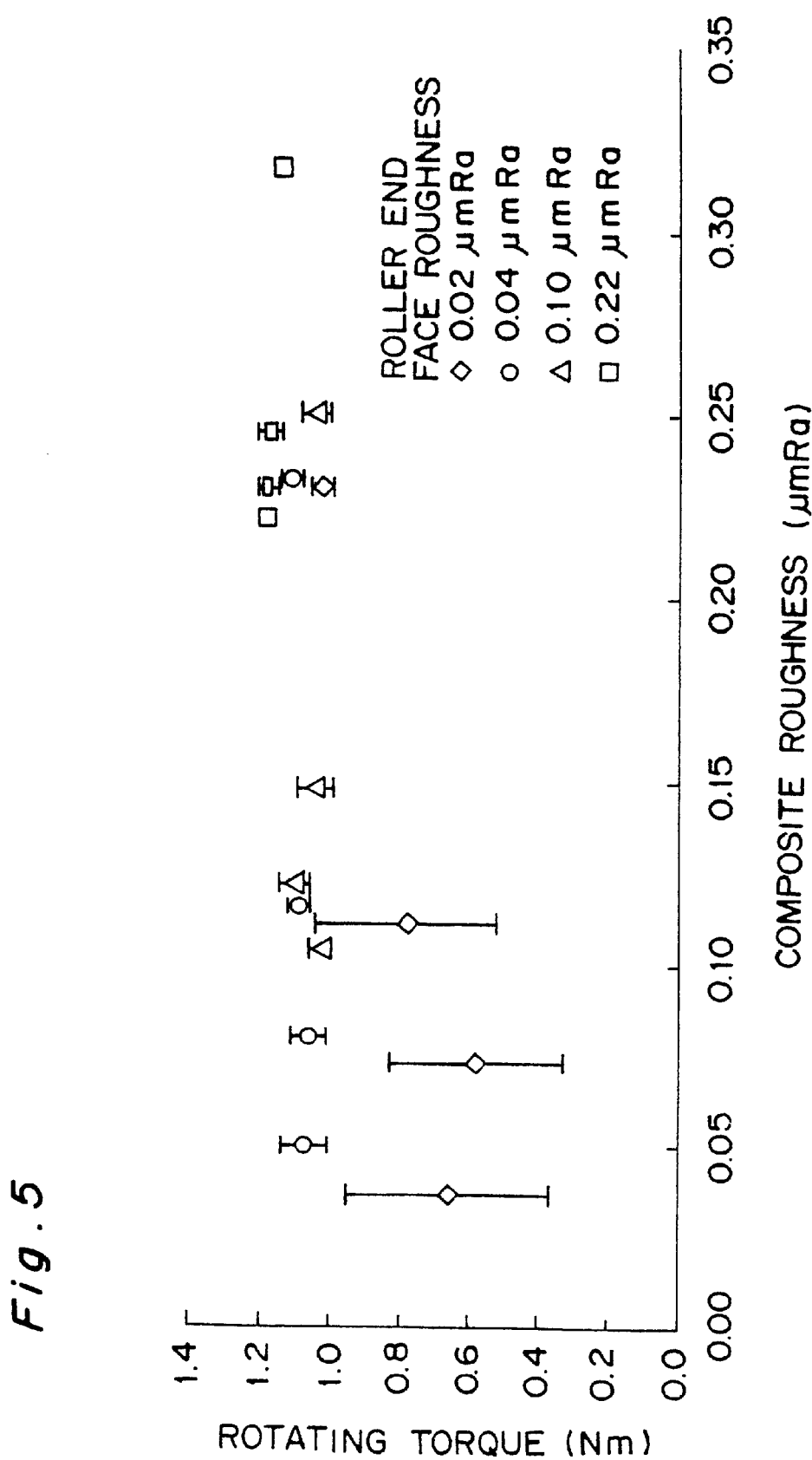
FIG. 5 is a characteristic view showing the relationship between the rotating torque and composite roughness.

In this connection, it was found by experiment that even if the composite roughness σ (Sara) holds generally unchanged as shown in FIG. 5, a change of the roller-end-face roughness $\sigma_1$ from 0.04 μmRa to 0.02 μmRa causes average value and fluctuations of rotating torque to largely change so that the rotating torque cannot be controlled only by the composite roughness σ. That is, it was found that the roller-end-face roughness $\sigma_1$ has a larger effect on the torque under low-speed rotation as compared with the rib-face roughness $\sigma_2$, and therefore that the control of the rollerend-face roughness $\sigma_1$ is important for the stabilization of assembling torque. It is noted that in the measurement examples of rotating torque in FIG. 4 and FIGS. 5 and 6, torque was measured with an axial load of 5.5 kN, a rotating speed of 50 rpm and a room temperature of 15–21° C. in a rust-preventive state.

Although the surface roughness $\sigma_1$ of the large end face 7 of the tapered roller 3 is set to be not less than 0.04 μmRa and not more than 0.10 μmRa in the above embodiment, the surface roughness $\sigma_1$ of the large end face 7 may also be set to within a range of 0.04 μmRa-0.22 μmRa. In this case, average value of mounting torque can be made to fall within a range of 1.03–1.18 (N·m) while the cone-back rib face roughness $\sigma_2$ is within a range of 0.03–0.23 μmRa, as shown in FIG. 4 and FIG. 8. Also, variation of average values of the mounting torque is 0.13 (N·m) at most. Meanwhile, if the surface roughness $\sigma_1$ of the large end face 7 is set to 0.02 μmRa, considerably large variations of torque result (0.58 N·m at maximum), where the average value of torque varies over a range of 0.58–1.02 N·m under the effects of the rib face roughness $\sigma_2$.

Also, although the composite roughness 6 is set to be not more than 0.12 μmRa in the above embodiment, the composite roughness 6 may also be set to 0.17 μmRa, in which case the preload retention rate can be made to be not less than 90% on a regression curve as shown in FIG. 7.

Further, the cone-back rib face 8 of the inner ring 1 may be not such a concave curved surface as shown in FIG. 3 but such a flat surface (with the radius of curvature R2 being infinite) as shown in FIG. 2. In this case, variations of torque (mounting torque) under low-speed rotation can be suppressed due to the fact that an oil film becomes hard to form at the sliding surface with the large end face 7 of the tapered roller 3. Also, when the cone-back rib face 8 is flat, the variation of contact position with the large end face 7 of the roller becomes smaller, as compared with the case where the cone-back rib face 8 is curved, producing an effect that variations in torque can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tapered roller bearing in which a large-end-face roughness $\sigma_1$ of a tapered roller is not less than 0.04 μmRa;

a composite roughness $\sigma$, which is a square root of a sum between a square of the large-end-face roughness $\sigma_1$, and a square of an inner ring large-end-face roughness $\sigma_2$ that makes sliding contact with the large end face of the tapered roller, is set to be not more than 0.17 μmRa;

a radius of curvature ratio R1/R2, which results from dividing a convex radius of curvature R1 of the large end face of the tapered roller by a concave radius of curvature R2 of the inner-ring large end face, is set to be not more than 0.35.

2. The tapered roller bearing according to claim 1, wherein:

the large-end-face roughness $\sigma_1$ of the tapered roller is set to be not more than 0.10 μmRa;

the composite roughness $\sigma$ is set to be not more than 0.12 μmRa; and the radius of curvature ratio R1/R2 is set to be not less than 0.07.

* * * * *